United States Patent
Zhou et al.

(10) Patent No.: US 11,711,794 B2
(45) Date of Patent: Jul. 25, 2023

(54) APPLYING A COMMON BEAM FOR MULTIPLE SIGNALS TO A DEFAULT PHYSICAL DOWNLINK SHARED CHANNEL (PDSCH) BEAM

(71) Applicant: QUALCOMM Incorporated, San Diego, CA (US)

(72) Inventors: Yan Zhou, San Diego, CA (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/210,651

(22) Filed: Mar. 24, 2021

(65) Prior Publication Data
US 2021/0360602 A1 Nov. 18, 2021

Related U.S. Application Data

(60) Provisional application No. 63/025,644, filed on May 15, 2020.

(51) Int. Cl.
*H04W 72/044* (2023.01)
*H04W 72/23* (2023.01)

(52) U.S. Cl.
CPC ......... *H04W 72/046* (2013.01); *H04W 72/23* (2023.01)

(58) Field of Classification Search
CPC .............. H04W 72/046; H04W 72/042; H04B 7/0695; H04B 7/0617; H04L 5/0023; H04L 5/0044; H04L 5/0094
See application file for complete search history.

(56) References Cited

U.S. PATENT DOCUMENTS

| | | | |
|---|---|---|---|
| 2019/0273637 A1 * | 9/2019 | Zhang | H04W 80/02 |
| 2020/0221485 A1 * | 7/2020 | Cirik | H04L 5/10 |
| 2021/0266947 A1 * | 8/2021 | Yang | H04L 5/0053 |

FOREIGN PATENT DOCUMENTS

| | | | | |
|---|---|---|---|---|
| CN | 111106915 A * | 5/2020 | | H04B 7/088 |
| WO | WO-2021068807 A1 * | 4/2021 | | H04L 5/0008 |

* cited by examiner

*Primary Examiner* — Shailendra Kumar
(74) *Attorney, Agent, or Firm* — Patterson + Sheridan, LLP

(57) ABSTRACT

Aspects of the present disclosure provide apparatus, methods, processing systems, and computer readable mediums for applying a common beam for multiple signals to a default beam for a physical downlink shared channel (PDSCH). An example method generally includes receiving, from a network entity, configuration information, identifying a common beam for wireless communications between the UE and the network entity based on the received configuration information, identifying a default beam based, at least in part, on the common beam and one or more rules, and receiving a physical downlink shared channel (PDSCH) by using the identified default beam.

30 Claims, 5 Drawing Sheets

APPLYING A COMMON BEAM FOR MULTIPLE SIGNALS TO A DEFAULT PHYSICAL DOWNLINK SHARED CHANNEL (PDSCH) BEAM

CROSS REFERENCE TO RELATED APPLICATION

This Application hereby claims priority under 35 U.S.C. § 119 to U.S. Provisional Patent Application No. 63/025,644, filed on May 15, 2020, the contents of which are incorporated herein in their entirety.

TECHNICAL FIELD

Aspects of the present disclosure relate to wireless communications, and more particularly, to techniques for applying a common beam to a default beam used to transmit and receive communications on a physical downlink shared channel (PDSCH).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes receiving, from a network entity, configuration information, identifying a common beam for wireless communications between the UE and the network entity based on the received configuration information, identifying a default beam based, at least in part, on the common beam and one or more rules, and receiving a physical downlink shared channel (PDSCH) by using the identified default beam.

One innovative aspect of the subject matter described in this disclosure can be implemented in a method for wireless communications by a network entity. The method generally includes transmitting, to a user equipment (UE), configuration information that the UE can use to identify a default beam for receiving a physical downlink shared channel (PDSCH), identifying a common beam for wireless communications between the UE and the network entity based on the received configuration information, identifying a default beam based, at least in part, on the common beam and one or more rules, and transmitting on the PDSCH by using the identified default beam.

One innovative aspect of the subject matter described in this disclosure can be implemented in a user equipment (UE). The UE generally includes means for receiving, from a network entity, configuration information, means for identifying a common beam for wireless communications between the UE and the network entity based on the received configuration information, means for identifying a default beam based, at least in part, on the common beam and one or more rules, and means for receiving a physical downlink shared channel (PDSCH) by using the identified default beam.

One innovative aspect of the subject matter described in this disclosure can be implemented in a network entity. The network entity generally includes means for transmitting, to a user equipment (UE), configuration information including information that the UE can use to identify a default beam for receiving a physical downlink shared channel (PDSCH), means for identifying a common beam for wireless communications between the UE and the network entity based on the configuration information, means for identifying a default beam based, at least in part, on the common beam and one or more rules, and means for transmitting on the PDSCH by using the identified default beam.

One innovative aspect of the subject matter described in this disclosure can be implemented in a user equipment (UE). The UE generally includes a receiver configured to receive, from a network entity, configuration information and a processing system configured to identify a common beam for wireless communications between the UE and the network entity based on the received configuration information and identify a default beam based, at least in part, on the common beam and one or more rules, wherein the receiver is further configured to receive a physical downlink shared channel (PDSCH) by using the identified default beam.

One innovative aspect of the subject matter described in this disclosure can be implemented in a network entity. The network entity generally includes a transmitter configured to transmit, to a user equipment (UE), configuration information including information that the UE can use to identify a default beam for receiving a physical downlink shared channel (PDSCH) and a processing system configured to identify a common beam for wireless communications between the UE and the network entity based on the configuration information and identify a default beam based, at least in part, on the common beam and one or more rules, wherein the transmitter is further configured to transmit on the PDSCH by using the identified default beam.

One innovative aspect of the subject matter described in this disclosure can be implemented in an apparatus for wireless communications by a user equipment (UE). The apparatus generally includes an interface configured to obtain, from a network entity, configuration information and a processing system configured to identify a common beam for wireless communications between the UE and the network entity based on the received configuration information and identify a default beam based, at least in part, on the common beam and one or more rules, wherein the interface is further configured to obtain a physical downlink shared channel (PDSCH) by using the identified default beam.

One innovative aspect of the subject matter described in this disclosure can be implemented in an apparatus for wireless communications by a network entity. The apparatus generally includes an interface configured to provide, for transmission to a user equipment (UE), configuration information including information that the UE can use to identify a default beam for receiving a physical downlink shared channel (PDSCH) and a processing system configured to identify a common beam for wireless communications between the UE and the network entity based on the configuration information, identify a default beam based, at least in part, on the common beam and one or more rules, and communicate on the PDSCH by using the identified default beam.

One innovative aspect of the subject matter described in this disclosure can be implemented in a computer-readable medium for wireless communications by a user equipment (UE). The computer-readable medium generally includes instructions executable to receive, from a network entity, configuration information, identify a common beam for wireless communications between the UE and the network entity based on the received configuration information, identify a default beam based, at least in part, on the common beam and one or more rules, and receive a physical downlink shared channel (PDSCH) by using the identified default beam.

One innovative aspect of the subject matter described in this disclosure can be implemented in a computer-readable medium for wireless communications by a network entity. The computer-readable medium generally includes instructions executable to transmit, to a user equipment (UE), configuration information including information that the UE can use to identify a default beam for receiving a physical downlink shared channel (PDSCH), identify a common beam for wireless communications between the UE and the network entity based on the configuration information, identify a default beam based, at least in part, on the common beam and one or more rules, and transmit on the PDSCH by using the identified default beam.

Aspects of the present disclosure provide means for, apparatus, processors, and computer-readable mediums for performing the methods described herein.

To the accomplishment of the foregoing and related ends, the one or more aspects include the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for applying a common beam for multiple signals to a default beam used to transmit and receive a physical downlink shared channel (PDSCH).

The following description provides examples of applying a common beam for multiple signals to a default beam used to transmit and receive a physical downlink shared channel (PDSCH), and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
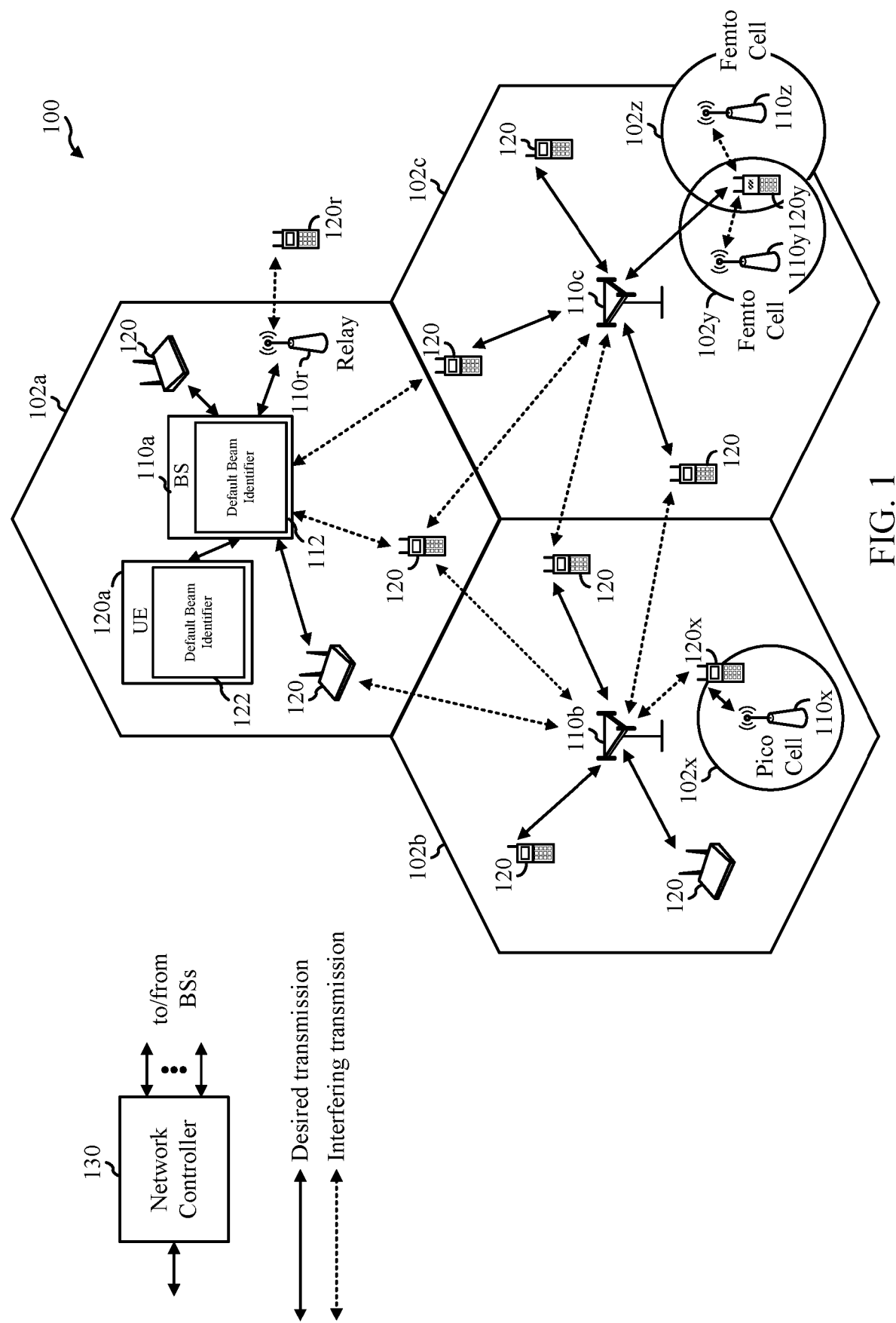
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a rate matching module 122 that may be configured to perform (or cause UE 120a to perform) operations 600 of FIG. 6. Similarly, a base station 110a may include a rate matching configuration module 112 that may be configured to transmit a DCI to UE 120a to schedule a PDSCH and cause the UE to perform operations 400 of FIG. 4.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
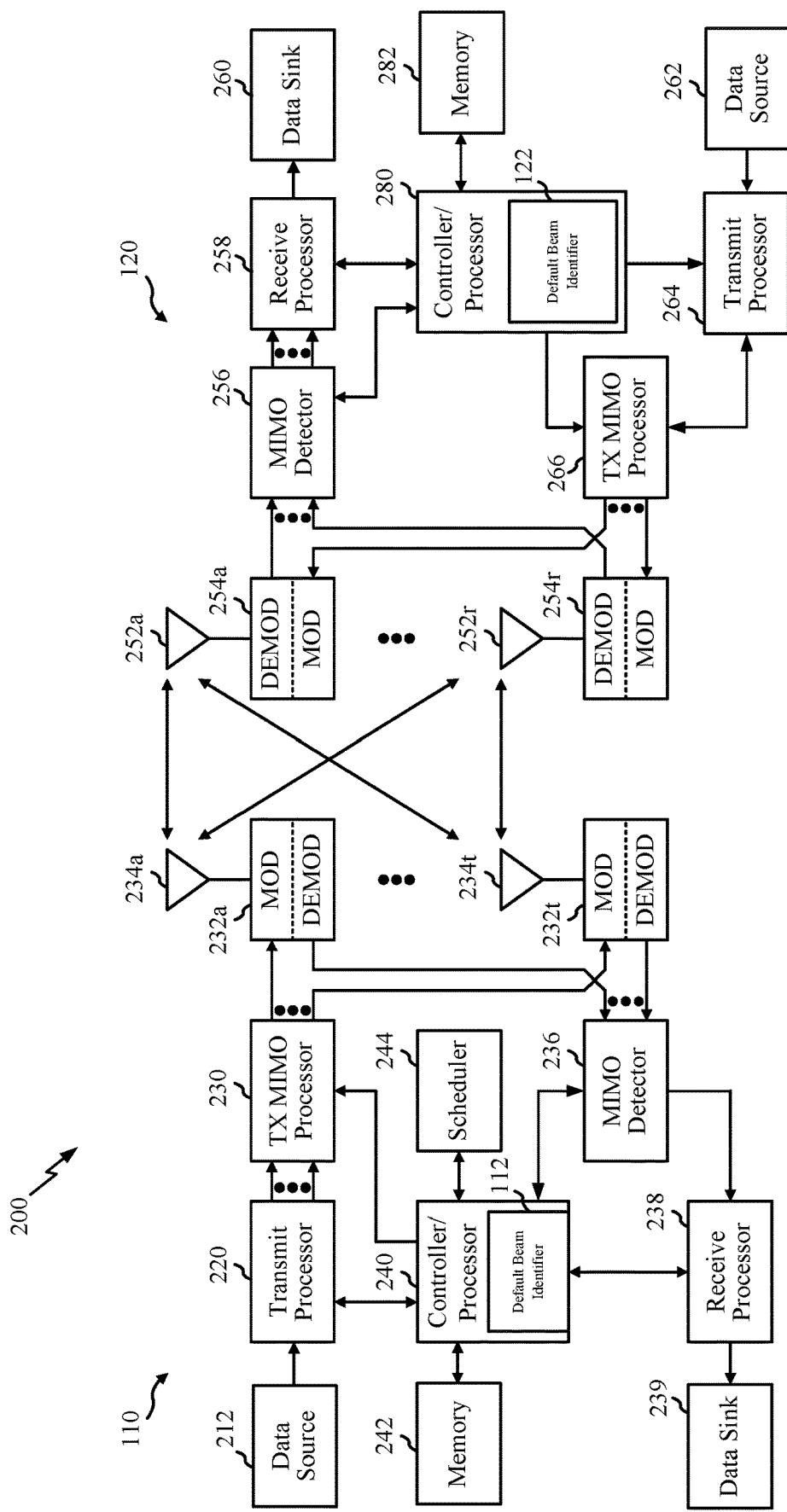
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIG. 4 or FIG. 5. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 has default beam identifier 122 that may be configured to perform operations 400 of FIG. 4, as discussed in further detail below. The controller/processor 240 of the base station 110 includes a default beam identifier 112 that may be configured perform operations 500 of FIG. 5, as discussed in further detail below. Although shown at the Controller/Processor, other components of the UE or BS may be used to perform the operations described herein.

Figure 3:
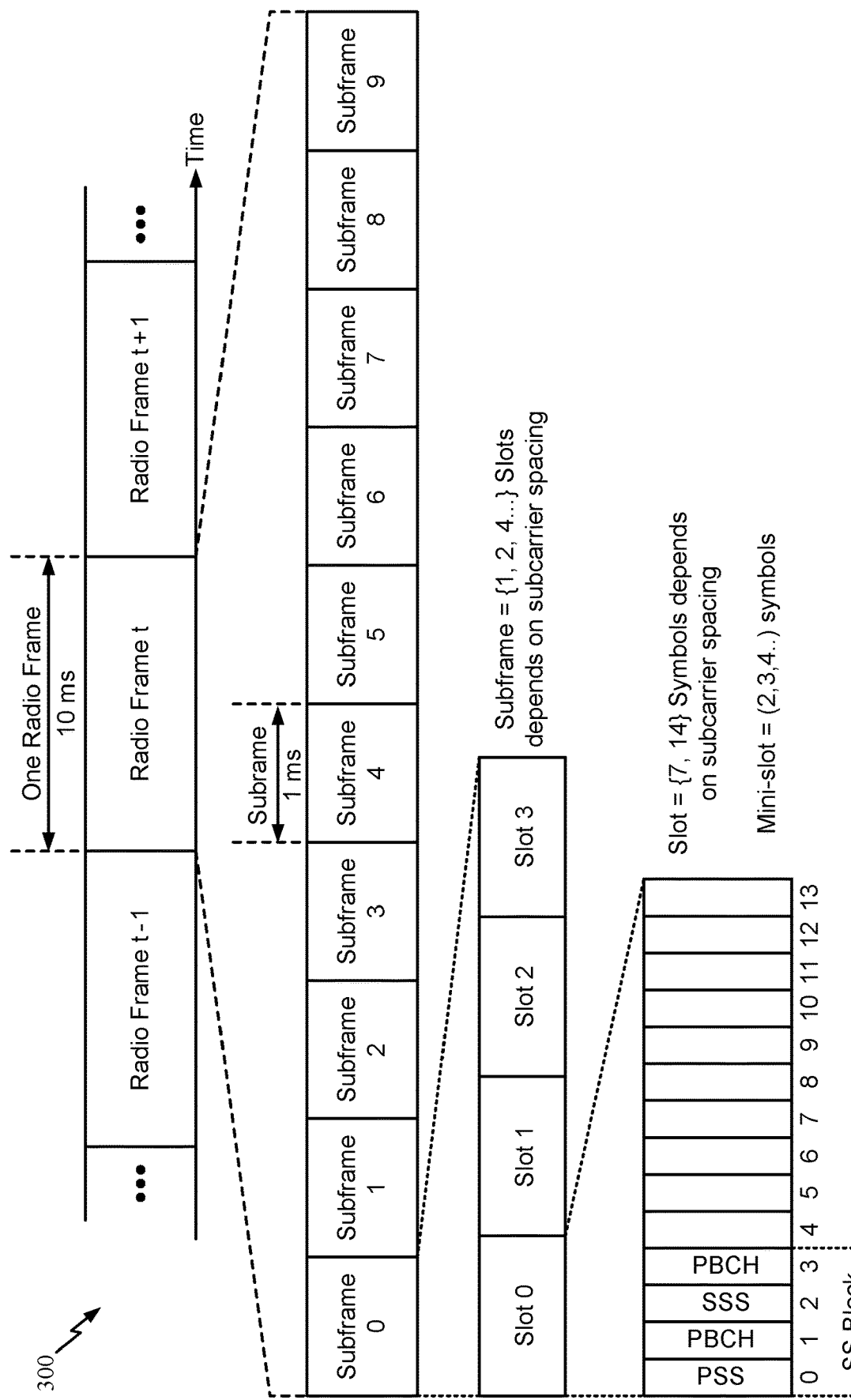
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may include one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may include a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Applying a Common Beam to a Default Beam for a Physical Downlink Shared Channel (PDSCH)

Aspects of the present disclosure provide apparatus, methods, processing systems, and computer readable mediums for applying a common beam for multiple signals to a default beam used to transmit and receive a physical downlink shared channel (PDSCH).

To reduce beam management latency and overhead, a common beam may be used for at least two signals in a wireless communications system. For example, a common beam may be used for transmitting and receiving data and/or control signaling on the downlink and/or the uplink. The common beam may be optimized based on various criteria. For example, the common beam may be refined as a sharp beam, which may improve a link budget for certain UEs (e.g., UEs that have limited mobility or are traveling at a low speed). In another example, the common beam may be optimized by selecting a wide beam width, which may improve robustness in high mobility or blocking scenarios. Generally, a default beam for a PDSCH, used when a scheduling offset is less than a beam switching latency threshold, may follow the beam of the CORESET with a lowest identifier in the latest monitored slot. Thus, the default beam for the PDSCH may vary across slots and may not be fixed (e.g., remain stable over time) like the optimized common beam.

In multi-beam operations (e.g., for FR1 and FR2 operations), efficiencies in beam management may target reductions in beam management latency and overhead to support higher intra-cell mobility and L1/L2-centric inter-cell mobility and/or an expanded number of configured transmission configuration indicator (TCI) states. For example, the use of a common beam for data and control transmission and reception may allow for the realization of such efficiencies in various scenarios, such as intra-band carrier aggregation. Other techniques that may allow for the realization of efficiencies in beam management procedures may include using a unified TCI framework for downlink and uplink beam indication or using enhanced signaling mechanisms that may improve latency and efficiency through increased usage of dynamic control signaling in lieu of radio resource control (RRC) signaling.

To realize efficiencies in beam management procedures, aspects of the present disclosure may provide for the application of a common beam used for at least two signals to be additionally applied to a default beam for a PDSCH. The at least two signals that the common beam may be used to transmit may be any combination of data, control, or reference signaling, in the downlink and/or uplink. For example, the common beam may be used for a physical downlink control channel (PDCCH), a PDSCH with a scheduling offset that exceeds a beam switching latency threshold, if the PDSCH is scheduled by downlink signaling (e.g., in a downlink control information (DCI)), a channel state information (CSI) reference signal (RS) (CSI-RS), a synchronization signal block (SSB), and a positioning reference signal (PRS). In another example, the common beam may be used for a physical uplink control channel (PUCCH), a physical uplink shared channel (PUSCH), a sounding reference signal (SRS), and a physical random access channel (PRACH). The default beam for the DSCH may be used to receive a PDSCH with a scheduling offset that is less than the beam switching latency threshold.

Figure 4:
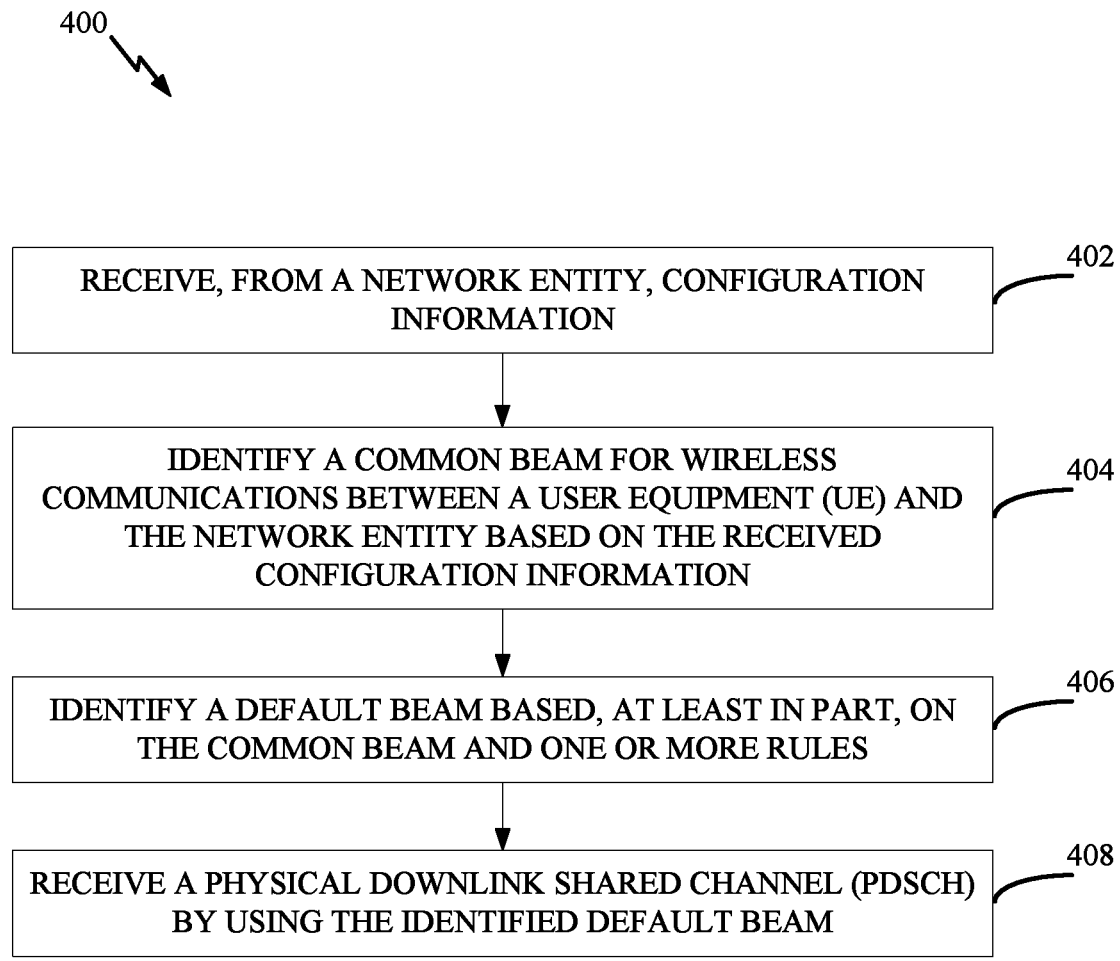
FIG. 4 illustrates example operations that may be performed by a user equipment (UE) to identify a default beam to use for receiving a physical downlink shared channel (PDSCH), in accordance with certain aspects of the present disclosure.

FIG. 4 illustrates example operations 400 that may be performed by a user equipment (UE) to apply a common beam to a default beam to use for receiving a physical downlink shared channel (PDSCH). As illustrated, operations 400 may begin at block 402, where the UE receives, from a network entity, configuration information.

At block 404, the UE identifies a common beam for wireless communications between the UE and the network entity based on the received configuration information.

At block 406, the UE identifies a default beam based, at least in part, on the common beam and one or more rules.

At block 408, the UE receives a physical downlink shared channel (PDSCH) by using the identified default beam.

Figure 5:
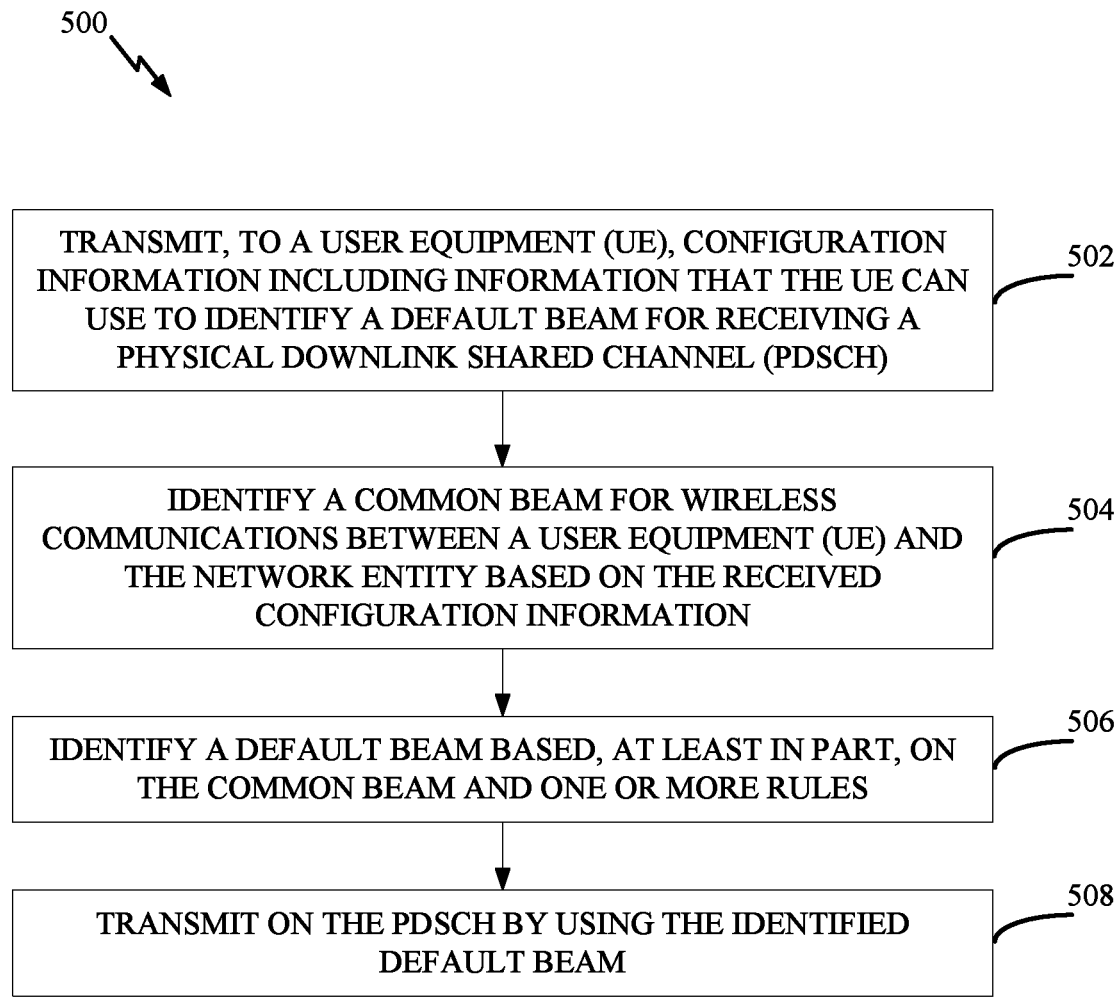
FIG. 5 illustrates example operations that may be performed by a network entity to identify a default beam to use for transmitting a physical downlink shared channel (PDSCH), in accordance with certain aspects of the present disclosure.

FIG. 5 illustrates example operations 500 that may be performed by a network entity (e.g., a gNodeB) to apply a common beam to a default beam to use for transmitting a physical downlink shared channel (PDSCH). As illustrated, operations 500 may begin at block 502, where the network entity transmits, to a user equipment, configuration information including information that the UE can use to identify a default beam for receiving a PDSCH.

At block 504, the network entity identifies a common beam for wireless communications between the UE and the network entity based on the received configuration information.

At block 506, the network entity identifies a default beam based, at least in part, on the common beam and one or more rules.

At block 508, the network entity transmits on the PDSCH by using the identified default beam.

In some embodiments, the common beam may be determined based on an implicit rule. For example, where a CORESET is configured in an active downlink (DL) bandwidth part (BWP), an implicit rule may specify that the common beam is identified based on a quasi-colocation (QCL) assumption for receiving a control resource set with the lowest or highest identifier in the active DL BWP. In another example, the implicit rule may identify the common beam based on a QCL assumption of an activated PDSCH transmission configuration indicator (TCI) state in the active DL BWP.

Where the common beam is determined based on an implicit rule, the application of the common beam to a default beam for a PDSCH may be signaled implicitly or explicitly. An implicit rule may specify that when a common beam is selected, the common beam may be used as the default PDSCH beam. An explicit rule may specify that the application of the common beam to the default beam may be indicated via downlink signaling. That is, the application of the common beam to the default beam may be dynamically signaled via, for example, a downlink control information (DCI), a medium access control (MAC) control element (CE) (MAC-CE), or in radio resource control (RRC) signaling (e.g., in a flag carried in the RRC signaling).

In some embodiments, the common beam may be determined based on an explicit rule. In one example, the explicit rule may specify that the common beam is identified based on a downlink signaling (e.g., a single DCI or MAC-CE) that jointly updates (1) the downlink TCI ID of one or more target downlink signals and (2) an uplink spatial relation identifier or uplink TCI identifier of one or more target uplink signals. In another example, the explicit rule may specify that the common beam is defined based on a single DCI that updates (1) the TCI of a semi-persistent or aperiodic reference signal (e.g., CSI-RS or SRS) resource that serves as a QCL source RS in both downlink TCIs of one or more target downlink signals and (2) an uplink spatial relation or uplink TCI of one or more target uplink signals. In still another example, the explicit rule may specify that the common beam is indicated for a group of uplink or downlink resources via downlink signaling (e.g., via RRC signaling, a MAC-CE, or a DCI). For example, RRC signaling may configure a resource group identifier for each uplink or downlink resource in a resource group or for a list of uplink and/or downlink resources in the group.

When the common beam is determined based on an explicit rule, the application of the common beam to a default beam for a PDSCH may be signaled implicitly or explicitly. An implicit rule may specify that when a common beam is selected, the common beam may be used as the default PDSCH beam. An explicit rule may specify that the application of the common beam to the default beam may be indicated via downlink signaling. That is, the application of the common beam to the default beam may be dynamically signaled via, for example, a downlink control information (DCI), a medium access control (MAC) control element (CE) (MAC-CE), or in radio resource control (RRC) signaling (e.g., in a flag carried in the RRC signaling). In some embodiments, application of the common beam to the default beam may be dynamically indicated in signaling used to update the common beam.

In some embodiments, the common beam may not be applied to the default beam for the PDSCH. In such a case, the default beam for the PDSCH may be determined based on a QCL assumption of the CORESET with the lowest identifier in the latest monitored slot in an active DL BWP. In another example, the network entity may indicate that the latest common beam is not to be applied to the default beam for the PDSCH. In such a case, the default beam for the PDSCH may be the last applicable common beam.

In a multi-TRP environment, the common beam may be a single beam or multiple beams. Whether the common beam includes a single beam or multiple beams may be determined based on a rule or dynamic signaling received from a network entity (e.g., in a DCI, a MAC-CE, or RRC signaling). In some embodiments, where the common beam includes a single beam, the common beam may be selected as the common beam identified for a particular TRP. The beam may be determined by a fixed rule; for example, a rule may specify that the common beam is the beam with the lowest TRP index or CORESET pool index. In some cases, the single common beam may be indicated via downlink signaling.

In some embodiments, the common beam may be multiple beams determined on a per-TRP basis. In a single-DCI-based multi-TRP scenario, the common beam for a first TRP may be determined based on a first TCI state in the TCI code point with the lowest identifier of the TCI code points mapped to two TCI states, and the common beam for a second TRP may be determined based on a second TCI state in the TCI code point. In a multi-DCI-based multi-TRP scenario, the common beam for a TRP may be determined based on a QCL assumption for receiving the CORESET with the lowest or highest identifier among CORESETS configured for an active downlink BWP and associated with the TRP (e.g., the CORESET having a corresponding CORESETPoolIndex). The application of the common beam for one TRP to the default beam for the PDSCH for the same TRP may be signaled implicitly or explicitly, as discussed above.

In addition to the various aspects described above, aspects of specific combinations are within the scope of the disclosure, some of which are detailed below:

Aspect 1: A method for wireless communications by a user equipment (UE), comprising: receiving, from a network entity, configuration information; identifying a common beam for wireless communications between the UE and the network entity based on the received configuration information; identifying a default beam based, at least in part, on the common beam and one or more rules; and receiving a physical downlink shared channel (PDSCH) by using the identified default beam.

Aspect 2: The method of Aspect 1, wherein identifying the common beam includes identifying the common beam using an implicit rule.

Aspect 3: The method of Aspect 2, wherein the implicit rule identifies the common beam based on a quasi-colocation (QCL) assumption for receiving a control resource set (CORESET) in an active downlink (DL) bandwidth part (BWP).

Aspect 4: The method of Aspect 2, wherein the implicit rule identifies the common beam based on a quasi-colocation (QCL) assumption of an activated PDSCH transmission configuration indicator (TCI) state in an active downlink (DL) bandwidth part (BWP).

Aspect 5: The method of any one of Aspects 1-4, wherein identifying the common beam includes identifying the common beam using an explicit rule.

Aspect 6: The method of Aspect 5, wherein: the explicit rule identifies the common beam based on the configuration information, and the configuration information jointly updates a downlink transmission configuration indicator (TCI) identifier for a target downlink signal and an uplink spatial relation or TCI identifier for a target uplink signal.

Aspect 7: The method of Aspect 5, wherein: the explicit rule identifies the common beam based on the configuration information, and the configuration information jointly updates a transmission configuration identifier (TCI) of a channel state information (CSI) reference signal (RS) (CSI-RS) or sounding RS (SRS) resource and an uplink spatial relation or TCI identifier for a target uplink signal.

Aspect 8: The method of any one of Aspects 1-7, wherein the one or more rules specify that the common beam is to be identified as the default beam.

Aspect 9: The method of any one of Aspects 1-8, further comprising: receiving an indication from the network entity, wherein the one or more rules specify that the common beam is to be identified as the default beam after the indication is received from the network entity.

Aspect 10: The method of any one of Aspects 1-9, wherein identifying the default beam includes identifying a beam other than the common beam as the default beam based on a quasi-colocation (QCL) assumption of a control resource set (CORESET) with a lowest identifier in a latest monitored slot of an active downlink bandwidth part (BWP).

Aspect 11: The method of any one of Aspects 1-10, wherein: the configuration information indicates that the common beam is not to be used as the default beam; and identifying the default beam includes identifying a previously applicable common beam as the default beam based on the indication that the common beam is not to be used as the default beam.

Aspect 12: The method of any one of Aspects 1-11, wherein the common beam includes a plurality of beams, each beam being used for communications between the UE and one of a plurality of network entities.

Aspect 13: The method of Aspect 12, wherein identifying the common beam includes: identifying each respective beam of the plurality of beams based on a respective transmission configuration indicator (TCI) state with a lowest identifier among TCI code points mapped to multiple TCI states.

Aspect 14: The method of Aspect 12, wherein identifying the common beam includes: identifying each respective beam of the plurality of beams based on a quasi-colocation (QCL) assumption for receiving a CORESET from a plurality of CORESETs in an active downlink bandwidth part (BWP), the plurality of CORESETs being associated with one of the plurality of network entities.

Aspect 15: The method of Aspect 12, further comprising: receiving an indication from the network entity; and determining that the common beam includes the plurality of beams based on the received indication.

Aspect 16: The method of any one of Aspects 1-15, wherein identifying the common beam includes: identifying a single beam, which has a lowest transmit receive point (TRP) index or CORESET pool index associated with one network entity in a plurality of network entities including the network entity, as the common beam.

Aspect 17: The method of any one of Aspects 1-16, further comprising: receiving an indication from the network entity, and wherein identifying the common beam includes: identifying a single beam for one network entity in a plurality of network entities including the network entity based on the indication.

Aspect 18: A method for wireless communications by a network entity, comprising: transmitting, to a user equipment (UE), configuration information including information that the UE can use to identify a default beam for receiving a physical downlink shared channel (PDSCH); identifying a common beam for wireless communications between the UE and the network entity based on the configuration information; identifying a default beam based, at least in part, on the common beam and one or more rules; and transmitting on the PDSCH by using the identified default beam.

Aspect 19: The method of Aspect 18, wherein identifying the common beam includes identifying the common beam using an implicit rule.

Aspect 20: The method of Aspect 19, wherein the implicit rule identifies the common beam based on a quasi-colocation (QCL) assumption for receiving a control resource set (CORESET) in an active downlink (DL) bandwidth part (BWP).

Aspect 21. The method of Aspect 19, wherein the implicit rule identifies the common beam based on a quasi-colocation (QCL) assumption of an activated PDSCH transmission configuration indicator (TCI) state in an active downlink (DL) bandwidth part (BWP).

Aspect 22: The method of any one of Aspects 18-21, wherein identifying the common beam includes identifying the common beam using an explicit rule.

Aspect 23: The method of Aspect 22, wherein: the explicit rule identifies the common beam based on the configuration information, and the configuration information jointly updates a downlink transmission configuration indicator (TCI) identifier for a target downlink signal and an uplink spatial relation or TCI identifier for a target uplink signal.

Aspect 24: The method of Aspect 22, wherein: the explicit rule identifies the common beam based on the configuration information, and the configuration information jointly updates a transmission configuration identifier (TCI) of a channel state information (CSI) reference signal (RS) (CSI-RS) or sounding RS (SRS) resource and an uplink spatial relation or TCI identifier for a target uplink signal.

Aspect 25: The method of any one of Aspects 18-24, wherein the one or more rules specify that the common beam is to be identified as the default beam.

Aspect 26: The method of any one of Aspects 18-25, further comprising: transmitting, to the UE, an indication, the indication triggering identification of the common beam as the default beam based on the one or more rules.

Aspect 27: The method of any one of Aspects 18-26, wherein identifying the default beam includes identifying a beam other than the common beam as the default beam based on a quasi-colocation (QCL) assumption of a control resource set (CORESET) with a lowest identifier in a latest monitored slot of an active downlink bandwidth part (BWP).

Aspect 28: The method of any one of Aspects 18-27, wherein: the configuration information indicates that the common beam is not to be used as the default beam; and identifying the default beam includes identifying a previously applicable common beam as the default beam based on the indication that the common beam is not to be used as the default beam.

Aspect 29: The method of any one of Aspects 18-28, wherein the common beam includes a plurality of beams, each beam being used for communications between the UE and one of a plurality of network entities including the network entity.

Aspect 30: The method of Aspect 29, wherein identifying the common beam includes: identifying each respective beam of the plurality of beams based on a respective transmission configuration indicator (TCI) state with a lowest identifier among TCI code points mapped to multiple TCI states.

Aspect 31: The method of Aspect 29, wherein identifying the common beam includes: identifying each respective beam of the plurality of beams based on a quasi-colocation (QCL) assumption for receiving a CORESET from a plurality of CORESETs in an active downlink bandwidth part (BWP), the plurality of CORESETs being associated with one of the plurality of network entities.

Aspect 32: The method of Aspect 29, further comprising: transmitting an indication to the UE, the indication signaling that the common beam includes the plurality of beams.

Aspect 33: The method of any one of Aspects 18-32, wherein identifying the common beam includes: identifying a single beam, which has lowest transmit receive point (TRP) index or CORESET pool index associated with one network entity in a plurality of network entities including the network entity, as the common beam.

Aspect 34: The method of any one of Aspects 18-33, further comprising: transmitting an indication to the UE including information indicating that the common beam includes a single beam and identifying the single beam for the network entity in a plurality of network entities.

Aspect 35: A user equipment (UE), comprising means for performing the operations of one or more of Aspects 1-17.

Aspect 36: A user equipment (UE), comprising a transceiver, at least one processor and memory, coupled to the at least one processor, comprising codes executable by the UE to perform the operations of one or more of Aspects 1-17.

Aspect 37: An apparatus for wireless communications by a user equipment (UE), including: an interface configured to obtain, from a network entity, configuration information; at least one processor; and memory, coupled to the at least one processor, including codes executable by the apparatus to identify a common beam for wireless communications between the UE and the network entity based on the received configuration information and identify a default beam based, at least in part, on the common beam and one or more rules, wherein the interface is further configured to obtain a physical downlink shared channel (PDSCH) by using the identified default beam.

Aspect 38: A computer-readable medium for wireless communications, comprising codes executable by a user equipment to perform the operations of one or more of Aspects 1-17.

Aspect 39: A network entity, comprising means for performing the operations of one or more of Aspects 18-34.

Aspect 40: A network entity, comprising a transceiver, at least one processor and memory, coupled to the at least one processor, comprising codes executable by the network entity to perform the operations of one or more of Aspects 18-34.

Aspect 41: An apparatus for wireless communications by a network entity, comprising: an interface configured to provide, for transmission to a user equipment (UE), configuration information including information that the UE can use to identify a default beam for receiving a physical downlink shared channel (PDSCH); at least one processor; and memory, coupled to the at least one processor, including codes executable by the apparatus to identify a common beam for wireless communications between the UE and the network entity based on the configuration information, identify a default beam based, at least in part, on the common beam and one or more rules, and communicate on the PDSCH by using the identified default beam.

Aspect 42: A computer-readable medium for wireless communications, comprising codes executable by a network entity to perform the operations of one or more of Aspects 18-34.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The previous description is provided to enable any person skilled in the art to practice the various aspects described herein.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 and/or processors 220, 230, 238, and/or controller/processor 240 of the BS 110 shown in FIG. 2 may be configured to perform operations 400 of FIG. 4 and operations 500 of FIG. 5.

Means for receiving may include a receiver such as antenna(s) and/or receive processor(s) illustrated in FIG. 2. Means for transmitting may include a transmitter such as antenna(s) and/or transmit processor(s) illustrated in FIG. 2. Means for identifying and means for determining may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    receiving, from a network entity, configuration information for at least identifying one or more beams for receiving a physical downlink shared channel (PDSCH);
    identifying a common beam for wireless communications between the UE and the network entity based on the received configuration information;
    identifying a default beam based, at least in part, on the common beam and one or more rules; and
    receiving the PDSCH by using the identified default beam.

2. The method of claim 1, wherein identifying the common beam comprises identifying the common beam using an implicit rule or an explicit rule.

3. The method of claim 2, wherein:
    the implicit rule identifies the common beam based on:
        a quasi-colocation (QCL) assumption for receiving a control resource set (CORESET) in an active downlink (DL) bandwidth part (BWP); or
        a quasi-colocation (QCL) assumption of an activated PDSCH transmission configuration indicator (TCI) state in an active downlink (DL) bandwidth part (BWP); and
    the explicit rule identifies the common beam based on the configuration information, and the configuration information jointly updates:
        a downlink transmission configuration indicator (TCI) identifier for a target downlink signal and an uplink spatial relation or TCI identifier for a target uplink signal; or
        a transmission configuration identifier (TCI) of a channel state information (CSI) reference signal (RS) (CSI-RS) or sounding RS (SRS) resource and an uplink spatial relation or TCI identifier for a target uplink signal.

4. The method of claim 1, further comprising:
    receiving an indication from the network entity, wherein:
    the one or more rules specify that the common beam is to be identified as the default beam after the indication is received from the network entity.

5. The method of claim 1, wherein identifying the default beam comprises identifying a beam other than the common beam as the default beam based on a quasi-colocation (QCL) assumption of a control resource set (CORESET) with a lowest identifier in a latest monitored slot of an active downlink bandwidth part (BWP).

6. The method of claim 1, wherein:
    the configuration information indicates that the common beam is not to be used as the default beam; and
    identifying the default beam comprises identifying a previously applicable common beam as the default beam based on the indication that the common beam is not to be used as the default beam.

7. The method of claim 1, wherein the common beam comprises a plurality of beams, each beam being used for communications between the UE and one of a plurality of network entities.

8. The method of claim 7, wherein identifying the common beam comprises:
    identifying each respective beam of the plurality of beams based on a respective transmission configuration indicator (TCI) state with a lowest identifier among TCI code points mapped to multiple TCI states.

9. The method of claim 7, wherein identifying the common beam comprises:
    identifying each respective beam of the plurality of beams based on a quasi-colocation (QCL) assumption for receiving a CORESET from a plurality of CORESETs in an active downlink bandwidth part (BWP), the plurality of CORESETs being associated with one of the plurality of network entities.

10. The method of claim 7, further comprising:
    receiving an indication from the network entity; and
    determining that the common beam comprises the plurality of beams based on the received indication.

11. The method of claim 1, wherein identifying the common beam comprises:
    identifying a single beam, which has a lowest transmit receive point (TRP) index or CORESET pool index associated with one network entity in a plurality of network entities including the network entity, as the common beam.

12. The method of claim 1, further comprising:
    receiving an indication from the network entity, and wherein identifying the common beam comprises:
    identifying a single beam for one network entity in a plurality of network entities including the network entity based on the indication.

13. A method for wireless communications by a network entity, comprising:
    transmitting, to a user equipment (UE), configuration information including information that the UE can use to identify a default beam for receiving a physical downlink shared channel (PD SCH);
    identifying a common beam for wireless communications between the UE and the network entity based on the configuration information;
    identifying a default beam based, at least in part, on the common beam and one or more rules; and
    transmitting on the PDSCH by using the identified default beam.

14. The method of claim 13, wherein identifying the common beam comprises identifying the common beam using an implicit rule or explicit rule.

15. The method of claim 14, wherein:
    the implicit rule identifies the common beam based on:
        a quasi-colocation (QCL) assumption for receiving a control resource set (CORESET) in an active downlink (DL) bandwidth part (BWP); or
        a quasi-colocation (QCL) assumption of an activated PDSCH transmission configuration indicator (TCI) state in an active downlink (DL) bandwidth part (BWP); and
    the explicit rule identifies the common beam based on the configuration information, and the configuration information jointly updates:
        a downlink transmission configuration indicator (TCI) identifier for a target downlink signal and an uplink spatial relation or TCI identifier for a target uplink signal; or
        a transmission configuration identifier (TCI) of a channel state information (CSI) reference signal (RS) (CSI-RS) or sounding RS (SRS) resource and an uplink spatial relation or TCI identifier for a target uplink signal.

16. The method of claim 13, further comprising:
transmitting, to the UE, an indication, the indication triggering identification of the common beam as the default beam based on the one or more rules.

17. The method of claim 13, wherein identifying the default beam comprises identifying a beam other than the common beam as the default beam based on a quasi-colocation (QCL) assumption of a control resource set (CORESET) with a lowest identifier in a latest monitored slot of an active downlink bandwidth part (BWP).

18. The method of claim 13, wherein:
the configuration information indicates that the common beam is not to be used as the default beam; and
identifying the default beam comprises identifying a previously applicable common beam as the default beam based on the indication that the common beam is not to be used as the default beam.

19. The method of claim 13, wherein the common beam comprises a plurality of beams, each beam being used for communications between the UE and one of a plurality of network entities including the network entity.

20. The method of claim 19, wherein identifying the common beam comprises:
identifying each respective beam of the plurality of beams based on a respective transmission configuration indicator (TCI) state with a lowest identifier among TCI code points mapped to multiple TCI states.

21. The method of claim 19, wherein identifying the common beam comprises:
identifying each respective beam of the plurality of beams based on a quasi-colocation (QCL) assumption for receiving a CORESET from a plurality of CORESETs in an active downlink bandwidth part (BWP), the plurality of CORESETs being associated with one of the plurality of network entities.

22. The method of claim 19, further comprising:
transmitting an indication to the UE, the indication signaling that the common beam comprises the plurality of beams.

23. The method of claim 13, wherein identifying the common beam comprises:
identifying a single beam, which has lowest transmit receive point (TRP) index or CORESET pool index associated with one network entity in a plurality of network entities including the network entity, as the common beam.

24. The method of claim 13, further comprising:
transmitting an indication to the UE including information indicating that the common beam comprises a single beam and identifying the single beam for the network entity in a plurality of network entities.

25. A user equipment (UE), comprising:
a receiver configured to receive, from a network entity, configuration information for at least identifying one or more beams for receiving a physical downlink shared channel (PDSCH);
at least one processor; and
memory coupled to the at least one processor, the memory comprising codes executable by the at least one processor to cause the UE to:
identify a common beam for wireless communications between the UE and the network entity based on the received configuration information; and
identify a default beam based, at least in part, on the common beam and one or more rules, wherein:
the receiver is further configured to receive the PDSCH by using the identified default beam.

26. The UE of claim 25, wherein the identification of the common beam comprises identifying the common beam using an implicit rule or explicit rule.

27. The UE of claim 26, wherein:
the implicit rule identifies the common beam based on:
a quasi-colocation (QCL) assumption for receiving a control resource set (CORESET) in an active downlink (DL) bandwidth part (BWP); or
a quasi-colocation (QCL) assumption of an activated PDSCH transmission configuration indicator (TCI) state in an active downlink (DL) bandwidth part (BWP); and
the explicit rule identifies the common beam based on the configuration information, and the configuration information jointly updates:
a downlink transmission configuration indicator (TCI) identifier for a target downlink signal and an uplink spatial relation or TCI identifier for a target uplink signal; or
a transmission configuration identifier (TCI) of a channel state information (CSI) reference signal (RS) (CSI-RS) or sounding RS (SRS) resource and an uplink spatial relation or TCI identifier for a target uplink signal.

28. A network entity, comprising:
a transmitter configured to transmit, to a user equipment (UE), configuration information including information that the UE can use to identify a default beam for receiving a physical downlink shared channel (PDSCH);
at least one processor; and
memory coupled to the at least one processor, the memory comprising codes executable by the at least one processor to cause the network to:
identify a common beam for wireless communications between the UE and the network entity based on the configuration information; and
identify a default beam based, at least in part, on the common beam and one or more rules, wherein:
the transmitter is further configured to transmit on the PDSCH by using the identified default beam.

29. The network entity of claim 28, wherein the identification of the common beam comprises identifying the common beam using an implicit rule or explicit rule.

30. The network entity of claim 29, wherein:
the implicit rule identifies the common beam based on:
a quasi-colocation (QCL) assumption for receiving a control resource set (CORESET) in an active downlink (DL) bandwidth part (BWP); or
a quasi-colocation (QCL) assumption of an activated PDSCH transmission configuration indicator (TCI) state in an active downlink (DL) bandwidth part (BWP); and
the explicit rule identifies the common beam based on the configuration information, and the configuration information jointly updates:
a downlink transmission configuration indicator (TCI) identifier for a target downlink signal and an uplink spatial relation or TCI identifier for a target uplink signal; or
a transmission configuration identifier (TCI) of a channel state information (CSI) reference signal (RS) (CSI-RS) or sounding RS (SRS) resource and an uplink spatial relation or TCI identifier for a target uplink signal.

* * * * *